(12) United States Patent
Saukkonen et al.

(10) Patent No.: US 11,518,858 B2
(45) Date of Patent: Dec. 6, 2022

(54) METHOD FOR FORMING A FILM COMPRISING NANOCELLULOSE

(71) Applicant: Stora Enso OYJ, Helsinki (FI)

(72) Inventors: Esa Saukkonen, Lappeenranta (FI); Isto Heiskanen, Imatra (FI); Kaj Backfolk, Lappeenranta (FI); Ville Ribu, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 174 days.

(21) Appl. No.: 16/345,994

(22) PCT Filed: Oct. 31, 2017

(86) PCT No.: PCT/IB2017/056762
§ 371 (c)(1),
(2) Date: Apr. 29, 2019

(87) PCT Pub. No.: WO2018/083592
PCT Pub. Date: May 11, 2018

(65) Prior Publication Data
US 2019/0276619 A1    Sep. 12, 2019

(30) Foreign Application Priority Data

Nov. 1, 2016  (SE) .................................... 1651443-2

(51) Int. Cl.
| | |
|---|---|
| *C08J 5/18* | (2006.01) |
| *D21H 11/18* | (2006.01) |
| *D21H 25/04* | (2006.01) |
| *C09D 101/02* | (2006.01) |
| *B32B 29/02* | (2006.01) |
| *D21H 19/34* | (2006.01) |
| *D21H 19/22* | (2006.01) |

(52) U.S. Cl.
CPC ................. *C08J 5/18* (2013.01); *B32B 29/02* (2013.01); *C09D 101/02* (2013.01); *D21H 11/18* (2013.01); *D21H 19/34* (2013.01); *D21H 25/04* (2013.01); *C08J 2301/02* (2013.01); *D21H 19/22* (2013.01)

(58) Field of Classification Search
CPC ..................................... C08J 5/18; B32B 3/26
See application file for complete search history.

(56) References Cited

U.S. PATENT DOCUMENTS

| | | |
|---|---|---|
| 2015/0082556 A1 | 3/2015 | Medoff |
| 2017/0266693 A1* | 9/2017 | Vartiainen ................ C08J 7/123 |

FOREIGN PATENT DOCUMENTS

| | | |
|---|---|---|
| CN | 104558996 A | 4/2015 |
| EP | 2554589 | 2/2013 |
| EP | 2660276 A1 | 11/2013 |
| EP | 2759577 | 7/2014 |
| WO | 2012090908 A1 | 7/2012 |
| WO | 2013042654 A1 | 3/2013 |
| WO | 2016083674 A1 | 6/2016 |

OTHER PUBLICATIONS

Billet, AINA, Supplementary European Search Report, dated May 6, 2020.
International Searching Authority, Written Opinion of the International Searching Authority, PCT/IB2017/056762, dated May 11, 2018.
International Searching Authority, International Search Report, PCT/IB2017/056762, dated May 11, 2018.
Chinga-Carrasco, G., "Cellulose fibres, nanofibrils and microfibrils,: The morphological sequence of MFC components from a plant physiology and fibre technology point of view," Nanoscale research letters 2011, 6:417.
Fengel, D., "Ultrastructural behavior of cell wall polysaccharides," Tappi J., Mar. 1970, vol. 53, No. 3.
Galland, S. et al., "UV-Cured Cellulose Nanofiber Composites with Moisture Durable Oxygen Barrier—Properties," Journal of Applied Polymer Science, 2014, vol. 131, p. 40604.
Lavoine, N., et al., "Microfibrillated Cellulose—Its Barrier Properties and Applications in Cellulose Materials: A Reivew," Carbohydrate Polymers, 2012, vol. 90, pp. 735-764.

* cited by examiner

*Primary Examiner* — Leigh C Maier
*Assistant Examiner* — Everett White
(74) *Attorney, Agent, or Firm* — Greer, Burns & Crain, Ltd.

(57) ABSTRACT

A method of forming a film comprising nanocellulose having an Oxygen Transmission Rate (OTR) value in the range of 0.1 to 300 cc/m²/24 h at 38° C. and 85% relative humidity (RH), and having a basis weight in the range of in the range of 0.1 to 45 g/m² wherein the method comprises the steps of; providing a suspension comprising nanocellulose, forming at least one layer of a web or a film from said suspension; drying said formed web or film to a dry content of at least 65 weight-%, wherein said method further comprises the steps of; treating at least one side of said dewatered and dried web or film with ultra violet (UV) or electron beam (EB) irradiation; and wherein at least one cooling step is provided in connection with or after the UV or EB treatment step.

22 Claims, No Drawings

METHOD FOR FORMING A FILM COMPRISING NANOCELLULOSE

This application is a U.S. National Phase under 35 U.S.C. § 371 of International Application No. PCT/IB2017/056762, filed Oct. 31, 2017, which claims priority under 35 U.S.C. §§ 119 and 365 to Swedish Application No. 1651443-2, filed Nov. 1, 2016.

TECHNICAL FIELD

The present invention relates to a method for forming a film having improved oxygen transmission resistance, or OTR value, in tropical conditions, i.e. at high humidity and high temperatures.

BACKGROUND

Films or coatings made from fine cellulosic fibers such as nanofibers or microfibrillated cellulose can for instance be used in packaging applications. One important requirement for these films or coatings is that the barrier properties, such as gas permeability, is low and not altered by environmental conditions, form of storage or post-converting.

In some applications, the films are provided with additional physical barriers, such as polymer or plastic laminates, or prepared with functional chemicals, e.g. cross-linkers or nanoparticles, in order to provide the film or coating with additional features or improved barrier properties required for more demanding applications. The use of plastics and other functional chemical is however sometime undesirable from an environmental and safety point of view.

Furthermore, if pulp fibers or microfibrillated cellulose absorbs moisture, the fibers will swell, especially in the cross direction of the fiber or fibril. This fiber/fibril swelling may be transferred into the film structure so that the film dimensions will change due to moisture changes. Even though the changes in dimensions might be small it might lead to big problems, especially in laminated structures since different components of a laminate change dimensions in different ways which may cause curling of the whole structure. The curling then causes big problems in converting and in the end use of the product. Dimensional stability is measured as dimensional changes when air relative humidity is changed.

Films or coatings made from microfibrillated cellulose (MFC) or nanofibrillated cellulose (NFC) are known to provide good oxygen or gas barrier properties including aroma barrier. It is known, however, that the films or coatings comprising high amount of MFC or NFC are very sensitive to moisture. When exposing such films in environment containing higher moisture such as in tropical conditions, the gas barrier properties are significantly reduced. Prior art teaches the use of various co-additives in the film comprising MFC or NFC or to laminate or co-extrude films e.g. with thermoplastic polymer that provides good water vapor transmission resistance. Unfortunately, many of the proposed solutions in the prior art are not industrially scalable or do not solve problems with bidirectional moisture sensitivity.

Prior art discloses also various irradiation treatment methods such as electron beam (EB) or ultraviolet (UV) to dry films. The document EP2759577 discloses a method of treating a film comprising a mixture of cellulose fibers and a swollen layered inorganic compound, which may be treated with UV irradiation or EB irradiation to improve the strength or adhesion properties of the film or to dry the film. This treatment is, however, made after obtaining the gas barrier properties of the said film.

There is a need for a method of producing a film comprising fine cellulosic fibers such as nanocellulose e.g. microfibrillated cellulose having improved gas or aroma barrier properties, i.e. an improved or higher oxygen transmission resistance at tropical conditions and an improved dimensional stability.

SUMMARY

It is an object of the present disclosure, to provide an improved method for producing a substantially dry film or web comprising nanocellulose.

More specific objects include providing a film or a web comprising nanocellulose with excellent barrier properties in tropical conditions, in cold storage conditions or occasions were surface condensation might occur.

The invention is defined by the appended independent claims. Embodiments are set forth in the appended dependent claims and in the following description and drawings.

According to a first aspect, there is provided a method of forming a film comprising nanocellulose wherein said films has an Oxygen Transmission Rate (OTR) value in the range of 0.1 to 300 cc/m$^2$/24 h at 38° C. and 85% relative humidity (RH), and a basis weight in the range of 0.1 to 45 g/m$^2$ wherein the method comprises the steps of; providing a suspension comprising nanocellulose, forming at least one layer of a web or a film from said suspension, drying said formed web or film to a dry content of at least 65 weight-%, and wherein said method further comprises the steps of; treating at least one side of said dried web or film with ultra violet (UV) or electron beam (EB) irradiation; and wherein at least one cooling is provided in connection with or after the UV or EB treatment step. The oxygen transmission rate is measured according to ASTM D-3985.

The film may be formed by applying said suspension to a substrate.

The film may be done in a paper making machine where the substrate is a porous wire on which the fibrous web is formed.

The substrate to which the suspension is applied may also be a paper, a paperboard, a plastic or a polymer substrate and the layer is formed as a coating layer on the substrate. The step of forming at least one layer of said web or film may be performed by coating, e.g. by cast coating of the suspension on the substrate.

The method may further comprise at least one pressing step being provided in connection with or after the UV or EB treatment step.

By the cooling step alternative the cooling and pressing step being provided in connection with the UV or EB treatment step is meant that the steps may take place immediately or directly after this treatment. Alternatively the film may be cooled after being provided with a polymer, such as PE film through extrusion coating, or at the same time as the film is provided with a PE lamination. The combination of the UV or EB irradiation and the subsequent immediate cooling step provides for an activation and/or dehydration or molecular changes in or of the film or web, and thus for a film or web having improved barrier characteristics, i.e. an excellent OTR value, especially in so called tropical conditions (high humidity and high temperature). The cooling step may provide compacting or densifying of the fibrils in the film, i.e. that the fibrils are brought closer together, effectively closing at least the surface of the film or web. The film does thus not have to have the required OTR properties before the treatment step, i.e. the OTR properties is provided through the UV or EB treatment together with the subsequent cooling step, which provides for an efficient way of forming a film having these properties. The film has also proven to have great storage stability during high moisture conditions. The UV or EB irradiation may provide a cross-linking effect of the film or of the surface of the film although changing hygroscopicity of the film through formation of other species cannot be neglected. This method enables at least the surface of the film to be activated by the UV or EB treatment, which also leads to kill of bacteria, increased adhesion to e.g. PE, and dehydration of the film, i.e. it may become substantially dry. This method thus provides for a way of forming a film that can be used in very humid conditions without deteriorating. Depending on the end product different barrier properties may be desirable, in some cases, small moisture penetration might be acceptable, but this methods then enables for less chemicals to be used to achieve the desired properties of the end product. Furthermore, since the UV or EB treatment leads to a kill of bacteria, problems associated with the use of contaminated process waters is greatly reduced, and the need for chemicals such as biocides can be reduced or abolished. This can be particularly important in packaging applications. Also, the drying of the MFC film may be enhanced or improved, leading to reduced energy consumption in the manufacturing process. In addition to providing a barrier for air, this method may also provide for a film or web having improved aroma and/or grease barrier properties. The inventive method may also provide a film having improved dimensional stability.

The least one layer of said web or film may have a basis weight in the range of 5 to 45 g/m². For a film produced on a paper machine this is a preferred basis weight.

The preferred basis weight of said web or film if it is casted is in the range of 0.1 to 5 g/m², or in the range of 0.1 to 3 g/m², or in the range of 0.1 to 1 g/m². For a coated or a cast coated film the basis weight or grammage may be around 0.1 g/m². A film coated through a printing machine, may have a basis weight around 0.5 g/m². A coated or printed film on paper or paperboard as a carriers substrate may have a basis weight as low as 0.1 g/m², meaning that the coat weight can be as low as 0.1-0.5 g/m2 however the basis weight of the carrier substrate is of course higher.

The UV or EB treatment may be performed on both sides of said web or film. This treatment can either be made consecutively or simultaneously, for instance by arranging UV lamps on both sides of the web or film.

The web or film may comprise multiple layers, and said treatment with UV or EB irradiation may be performed on one or both sides of said web or film.

The cooling step may comprise any one of contacting said treated at least one side of said at least one layer of said web or film with a cooling element to form a web or film.

The cooling element is any one of any one of a chill roll, chill cylinder, calendar or air cooling.

The cooling element may also comprise other means for cooling the film or web after the UV or EB irradiation treatment. The cooling step may also be a step where a surface densification of the film is provided. The cooling step may also be combined with a pressing step. The cooling and pressing step may take place in the same equipment or in separate pieces of equipment.

The cooling step may alternatively comprise storage of said at least one layer of said web or film at a temperature around 40° C. or less.

The wavelength of the UV irradiation used may be in the range of 200 nm to 380 nm. The optimal UV wavelength for treatment of the film or web will depend on the characteristics of the film, i.e. the content of nanocellulose, the thickness and density of the film, and on the content and type of additives. It is possible that the film or web may be treated with multiple UV lamps having different wavelength emissions.

The fibrous suspension may have a content of nanocellulose in a range of 0.1 to 50 wt-% based on total dry content of the suspension.

The film or web may comprise 100 wt-% nanocellulose based on the total dry content of the film or web. According to one alternative the fibrous suspension may also contain other types of components, such as conventional paper making chemicals, i.e. fillers etc. and other additives for the production of the film.

The at least one layer of said film or web may be provided with a polymer coating layer subsequent to said treatment step and prior to said cooling step.

The solid content of the film or web after the dewatering and drying step and UV or EB treatment step may be at least 65 weight-%, or at least 75 weight-% or at least 85 weight-%. This means that the film or web is substantially dry after the treatment and cooling step.

The nanocellulose may be any one of microfibrillated cellulose or nanocrystalline cellulose or a combination thereof.

The UV or EB treated film or web may comprise at least 50 weight-% nanocellulose, or at least 70 weight-% nanocellulose, i.e. weight-% based on the total dry content of the film. The film may even comprise 100 weight-% nanocellulose.

The OTR value of the web or film may be in the range of 10 to 250 cc/m²/24 h at 38° C. and 85% relative humidity (RH), or in the range of 40 to 250 cc/m²/24 h at 38° C. and 85% relative humidity (RH), or in the range of 110 to 250 cc/m²/24 h at 38° C. and 85% relative humidity (RH). The oxygen transmission rate is measured according to ASTM D-3985.

The film or web may further be provided with or contacted with at least one photo-active material. By photo-active material is meant a chemical which facilitates or undergoes cross-linking when subjected to UV light or EB irradiation. The web or film might for instance be contacted with, on the opposite side of the UV or EB irradiation source, a roll coated with a layer of $TiO_2$. This might provide for absorption of the UV light and enable further reactions and activation of the surface of the film or web. Alternatively, photo-active chemicals may be added to the suspension comprising nanocellulose, e.g. $H_2O_2$ can be added. The $H_2O_2$ will act as an electron receptor in the film or in the surface of the film or web.

According to a second aspect there is provided a substantially dry film comprising microfibrillated cellulose having an Oxygen Transmission Rate (OTR) value in the range of 0.1 to 300 cc/m²/24 h at 38° C. and 85% relative humidity (RH) obtained by the method according to the first aspect.

Due to the excellent gas barrier properties of this film, it may be used as a film for instance forming a packaging material, or as a coating on a substrate such as paper or paperboard which may be used in for instance packaging or storage applications even at tropical conditions, i.e. high RH and high temperatures. The film may in particular be utilized in packaging applications for food, liquids and drugs. The film may comprise at least 50% nanocellulose.

According to a third aspect there is provided the use of the film according to the second aspect for packaging and storage applications, this film may be in particular suitable for use in s called tropical conditions, but also in normal conditions, i.e. relatively low RH and lower temperatures.

DETAILED DESCRIPTION

The present invention relates to an inventive method of forming or manufacturing of a film or web comprising nanocellulose. The film or web is preferably substantially dried. The film or web has, in its dried state an oxygen transmission rate in the range of 0.1 to 300 cc/m$^2$/24 h at 38° C. and 85% relative humidity (RH). With dry state is meant that the dry content of the film or web is at least 90 weight-%, preferably at least 92 weight-%. The oxygen transmission rate is measured according to ASTM D-3985.

In the inventive method a suspension comprising nanocellulose is provided. The suspension may for instance be a stock suspension, which is applied on a wire section in a paper or paperboard making machine. The drying of the web on the wire may include dewatering of the web on the wire. With paper making machine is meant any kind of paper making machine known to a person skilled in the art used for making paper, paperboard, tissue or any similar products.

The film or web may be also be a casted film, i.e. a wet suspension comprising the nanocellulose is cast coated or casted on a substrate. The substrate to which the suspension is casted is preferably a polymer or metal substrate. The cast coated fibrous web on a polymer or metal substrate can be dried in any conventional manner and thereafter optionally peeled off from the substrate. The casted web (either peeled off fibrous web or a multilayer structure comprising the fibrous web and the substrate) may thereafter be dried in any conventional drying equipment to create a dried film which thereafter is treated with UV or EB treatment according to the invention. It may be possible to cast or coat more than one layer of the suspension onto the substrate forming a multilayer MFC film.

It may also be possible to apply the suspension comprising nanocellulose to a paper or paperboard substrate to form a coated paper or paperboard substrate. The formation of a coating or coating layer may be provided to the substrate by any conventional coating techniques known in the art. These include for instance roll coating, spray coating, foam coating, printing and screening techniques, blade coating, film press, surface sizing, curtain coating, rotogravure, reverse gravure and kiss coater.

The suspension may also comprise other types of fibers, such as longer cellulose fibers (conventional pulp fibers), and/or additives, such as conventional papermaking chemicals and additives, for instance retention chemicals, wet-strength additives, and sizing agents.

Depending substantially on the method of providing or applying the web or film, the web or film may have a basis weight, or grammage, in the range of 0.1 to 45 g/m$^2$.

A coated and/or casted film conventionally has a basis weight around 0.1 g/m$^2$, and a printed film may have a basis weight around 0.5 g/m$^2$.

For a so called stand alone film the basis weight conventionally is in the range of 5 to 45 g/m$^2$ or 10 to 45 g/m$^2$, and a more preferred range may be 10 to 30 g/m$^2$.

The web or film is then dried to a dry content of about 65 weight-% or more, more preferably 75 weight-% or more, and most preferably 85 weight-% or more. The drying of the film or web may be performed by any conventional means, such as for instance by dewatering on a wire, by heating, by pressing or by vacuum. The web or film may be dewatered, dried or pre-heated by air drying or infrared drying before the UV or EB irradiation step.

After the drying step the web or film comprising the nanocellulose undergoes a treatment step with ultraviolet or electron beam irradiation. This means that the film or web is irradiated on at least one side thereof by a UV lamp or EB equipment, or other types of equipment for this type of treatment known in the art. Since the film or web is dewatered and dried before this treatment step no further drying is essentially performed in this treatment step, and it is only an activation of the film or at least the surface of the film that takes place.

The web or film may alternatively be treated on both sides, for instance by using several UV lamps arranged on either side of the film. Providing treatment on both sides may be in particular advantageous when the film has a certain grammage or transparency which would not allow treatment and activation of substantially the entire film. According to another alternative, UV lamps having different wavelengths, i.e. operating in different wavelength ranges, that may or may not be overlapping, may be provided for treatment of the film.

After the treatment step with UV or EB irradiation a cooling step for the film or web follows. This means that the film or web may be cooled and optionally also treated in a pressing step. For instance, a calender press that is cold or chilled may be used for a combined cooling and pressing step.

Alternatively the film or web may be provided with a polymer coating, for instance through extrusion of a polyethylene (PE) film on at least one side thereof prior to the cooling step but subsequent to the treatment step. As an example the polymer film may be applied on the treated film or web and in a step directly after or in connection with the application of the polymer the film may be contacted to a chill roll.

By a cooling step is meant that the film is either actively cooled down, or that it is kept at a storage temperature of 40° C. or less. By actively cooling is meant that the web or film may be contacted for instance to a chill roll, calendar or chill cylinder or that it is cooled by air cooling. As an example a chill roll having a temperature in the range of 4 to 20° C. may be used to cool the film. The cooling step may be combined with a pressing step, for instance in a calendar or a press nip. Alternatively, for instance the calendar may be cold to provide a simultaneous cooling and pressing operation. It is also conceivable that other types of cooling equipment may be used.

Depending on the machine speed treatment with UV or EB irradiation may be performed such that a temperature of the web or film less than 70° C., or less than 65° C. or less than 60° C. When such low temperatures are used during the treatment step the UV or EB radiation may predominantly be considered as a treatment of the film for activation of the surface of the film, and that the irradiation therefore only has a marginal effect on the actual drying of the film.

The web or film is preferably transparent enough for the UV or EB irradiation to penetrate into the entire thickness of the film, thus activating not only the surface but the entire thickness of the film or material. Alternatively the film is treated on both sides to achieve the activation throughout the thickness of the material. This means that the energy exerted on or provided onto the surface of the film may be adapted depending on factors such as the machine speed, the basis weight of the film or web and the transmittance of the film or web in order to achieve a sufficient activation of the film.

The film or web may for instance have a light transmittance in the range of 40 to 75% in the ultra violet transparency wavelength range of 200 to 400 nm.

The film or web may also be provided with photo-activation chemicals. These chemicals enable further reactions and activation of the surface and film in that they enhance the absorption of UV light. These may for instance be incorporated into the film, for instance mixed in a stock solution or in a coating solution before the film is dewatered.

Alternatively the film or web may be contacted with such chemicals, for instance the opposite cylinder in the paper making machine may be coated with a photoactive layer.

As an example, a layer of $TiO_2$ may be coated on a cylinder and the film or web may be contacted with this layer. Alternatively, $H_2O_2$ may be added to the suspension comprising nanocellulose. The, $H_2O_2$ can then act as an electron receptor. Other examples of suitable additives to enhance the UV or EB treatment may include starch, cellulose and polyvinyl acetate (PVA).

The effectiveness of the UV or EB treatment will thus be dependent on different factors and such as the type of nanocellulose used, the machine speed, the gram mage or basis weight of the film, the machine construction and the activation energy provided by the UV or EB treatment. This will have to be optimized from case to case, which is readily understood by the skilled person and with guidance from this description.

The suspension comprising nanocellulose may comprise at least 50 weight-% of nanocellulose based on total dry content of the suspension. The remaining portion may comprise other fibers, such as longer (normal) cellulose or cellulosic fibers and/or additives such as conventional papermaking additives, e.g. retention chemicals, wet-strength additives and sizing agents, or other additives and chemicals, such as chemical improving or enhancing the UV or EB treatment and activation of the film.

According to one alternative the UV or EB treated film or web comprises at least 50 weight-% nanocellulose based on the dry content of the film or web.

According to one alternative the UV or EB treated film or web comprises at least 70 weight-% nanocellulose based on the dry content of the film or web.

According to one alternative the UV or EB treated film comprises a mixture of at least 70 weight-% nanocellulose and between 20-30 weight-% of longer cellulose fibers, and optionally additional additives, fibers and/or chemicals.

By nanocellulose is meant cellulose fibers that may be any one of microfibrillated cellulose or nanocrystalline cellulose, or a mixture or combinations thereof.

Microfibrillated cellulose (MFC) or so called cellulose microfibrils (CMF) shall in the context of the patent application mean a nano scale cellulose particle fiber or fibril with at least one dimension less than 100 nm. MFC comprises partly or totally fibrillated cellulose or lignocellulose fibers. The liberated fibrils have a diameter less than 100 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril (Fengel, D., *Ultrastructural behavior of cell wall polysaccharides*, Tappi J., March 1970, Vol 53, No. 3), is the main product that is obtained when making MFC e.g. by using an extended refining process or pressure-drop disintegration process. Depending on the source and the manufacturing process, the length of the fibrils can vary from around 1 to more than 10 micrometers. A coarse MFC grade might contain a substantial fraction of fibrillated fibers, i.e. protruding fibrils from the tracheid (cellulose fiber), and with a certain amount of fibrils liberated from the tracheid (cellulose fiber).

There are different acronyms for MFC such as cellulose microfibrils, fibrillated cellulose, nanofibrillated cellulose, fibril aggregates, nanoscale cellulose fibrils, cellulose nanofibers, cellulose nanofibrils, cellulose microfibers, cellulose fibrils, microfibrillar cellulose, microfibril aggregates and cellulose microfibril aggregates. MFC can also be characterized by various physical or physical-chemical properties such as large surface area or its ability to form a gel-like material at low solids (1-5 wt %) when dispersed in water. The cellulose fiber is preferably fibrillated to such an extent that the final specific surface area of the formed MFC is from about 1 to about 300 $m^2/g$, such as from 1 to 200 $m^2/g$ or more preferably 50-200 $m^2/g$ when determined for a freeze-dried material with the BET method.

Various methods exist to make MFC, such as single or multiple pass refining, pre-hydrolysis followed by refining or high shear disintegration or liberation of fibrils. One or several pre-treatment step is usually required in order to make MFC manufacturing both energy efficient and sustainable. The cellulose fibers of the pulp to be supplied may thus be pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CMC), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC or NFC.

The nanofibrillar cellulose may contain some hemicelluloses; the amount is dependent on the plant source. Mechanical disintegration of the pre-treated fibers, e.g. hydrolysed, pre-swelled, or oxidized cellulose raw material is carried out with suitable equipment such as a refiner, grinder, homogenizer, colloider, friction grinder, ultrasound sonicator, single- or twin-screw extruder, fluidizer such as microfluidizer, macrofluidizer or fluidizer-type homogenizer. Depending on the MFC manufacturing method, the product might also contain fines, or nanocrystalline cellulose or e.g. other chemicals present in wood fibers or in papermaking process. The product might also contain various amounts of micron size fiber particles that have not been efficiently fibrillated.

MFC can be produced from wood cellulose fibers, both from hardwood or softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper.

The above described definition of MFC includes, but is not limited to, the proposed TAPPI standard W13021 on cellulose nano or microfibril (CMF) defining a cellulose nanofiber material containing multiple elementary fibrils with both crystalline and amorphous regions, having a high aspect ratio with width of 5-30 nm and aspect ratio usually greater than 50

Trials and Results

Example 1

Trials were conducted on a pilot paper machine with running speed of 15 m/min and 9 m/min to produce a MFC film comprising MFC made from softwood (3) and hardwood (2B) Kraft pulp, respectively. In addition to MFC, a retention system and wet-strength chemicals was used. Further, a hydrophobic sizing agent was applied into the wet end. Table 1 summarizes the samples and their oxygen barrier properties.

TABLE 1

Samples * determined at 85% RH, 38° C.

| Fiber source, % | 3<br>MFC 100 (softwood) | 2B<br>MFC 100 (hardwood) |
|---|---|---|
| Target grammage g/m² | 30 | 30 |
| OTR cc/m²/24 h* | 221 | 280 |

The MFC films 3 and 2B produced on a pilot paper machine were treated with UV light from a UV source and then cooled by contacting the samples with a chill roll. Variables in the trial were machine line speed (m/min) and pressure in the chill roll nip (bar). Trial conditions are shown in Table 2.

TABLE 2

Trial conditions

| Trial test point | Speed [m/min] | Chill roll nip pressure [bar] | Power | MFC film web temperature (° C.) under UV light source | before chill roll nip | after contact with chill roll | Time between UV light activation and contact with chill roll (s) |
|---|---|---|---|---|---|---|---|
| B1 | 20  | 2.5 | 2 | 60 | 40 | 19 | 2.4 |
| B3 | 200 | 2.5 | 2 | 35 | 26 | 19 | 0.24 |
| D1 | 20  | 4   | 2 | 60 | 40 | 19 | 2.4 |
| F1 | 20  | 5.5 | 2 | 60 | 40 | 19 | 2.4 |
| F3 | 200 | 5.5 | 2 | 35 | 26 | 19 | 0.24 |

The results of the trials carried out are disclosed in Table 3 where the measured Oxygen transmission rates (OTR) for the treated samples are disclosed. In order to evaluate the effect of the UV light activation non-treated MFC films 3 and 2B were extrusion PE-coated with 25 g/m² of LDPE. Measurements were made in 85% relative humidity (RH) and 38° C. temperature after conditioning the samples to equilibrium moisture content in the same conditions.

TABLE 3

Trial results for OTR value at 38° C., 85% RH * determined at 85% RH, 38° C.

| | ref 2B | ref 3 | B1 2B | B1 3 | B3 2B | B3 3 | D1 2B | D1 3 | F1 2B | F1 3 | F3 2B | F3 3 | LDPE 2B | LDPE 3 |
|---|---|---|---|---|---|---|---|---|---|---|---|---|---|---|
| OTR, (cc/m2/24 h)* | 280 | 221 | 181 | 129 | 198 | 167 | 77 | 57 | 84 | 153 | 222 | 145 | 148 | 104 |

With UV light activation and subsequent cooling (contact with chill roll) of the MFC film the OTR level in tropical conditions (85% RH, 38° C.) of the MFC film can be decreased to approximately same level or even to a lower level than with non-treated PE-coated MFC film.

Example 2

Trials were conducted on a pilot paper machine with running speed of 30 m/min to produce a MFC film (P4_17 KP1) from softwood. The 31.0 gsm MFC film was treated with UV light for 60 minutes with three different irradiance levels in a Q-Sun Xenon Test Chamber. After UV-treatment the MFC film samples were allowed to cool in room temperature (without applying any pressure) prior to measurement of the oxygen transmission rate with Mocon Oxtran 2/22.

TABLE 4

Results for OTR value after UV-treatment and cooling the samples at room temperature

| Sample | OTR, cc/(m²-day), 23° C./50% RH | OTR, cc/(m²-day), 38° C./85% RH | Reduction in OTR value compared to reference sample in 23° C./50% RH | Reduction in OTR value compared to reference sample in 38° C./85% RH |
|---|---|---|---|---|
| P4_17 KP 1, reference | 7.0 | 109 | — | — |
| 0.5 W/m² 60 min | 4.6 | 86 | −35% | −21% |
| 1.0 W/m² 60 min | 5.8 | 99 | −17% | −9% |
| 1.2 W/m² 60 min | 5.2 | 93 | −26% | −15% |

As shown in Table 4, the OTR in both normal (23° C./50% RH) and tropical (38° C./85% RH) conditions can be improved with UV treatment of the MFC film followed by subjecting the film to a cooling step at storage.

The invention claimed is:

1. A method of forming a film comprising nanocellulose having an Oxygen Transmission Rate (OTR) value in the range of 0.1 to 300 cc/m²/24 h at 38° C. and 85% relative humidity (RH), and having a basis weight in the range of 0.1 to 45 g/m² wherein the method comprises:
   providing a suspension comprising nanocellulose;
   forming at least one layer of a web or a film from said suspension;
   drying said formed web or film to a dry content of at least 65 weight-%; and,
   treating at least one side of the dried web or film with ultra violet (UV) or electron beam (EB) irradiation forming at least one treated side of a treated web or film and actively cooling the at least one treated side immediately or directly after the UV or EB treatment, wherein actively cooling the at least one treated side comprises contacting the at least one treated side with a cooling element to produce a cooled substantially dry web or film, wherein the cooled substantially dry web or film has a temperature less than a temperature of the dried web or film, wherein the cooling element is any one of a chill roll, chill cylinder, and calendar, and wherein the cooling element has a temperature in a range of 4 to 20° C.;
   wherein the treated web or film comprises at least 50 wt % nanocellulose based on total dry content of the web or film; and
   wherein the nanocellulose is microfibrillated cellulose.

2. The method as claimed in claim 1, wherein the step of forming at least one layer of said web or film is done by applying said suspension to a substrate.

3. The method according to claim 2 wherein the substrate is a porous wire in a paper making machine.

4. The method as claimed in claim 2, wherein the substrate is a paper, a paperboard, a plastic or a polymer substrate.

5. The method as claimed in claim 1, wherein said UV or EB treatment is performed on both sides of said web or film.

6. The method as claimed in claim 1, wherein said web or film comprises multiple layers, and wherein said treatment with UV or EB irradiation is performed on one or both sides of said web or film.

7. The method as claimed in claim 1, wherein said web or film comprises multiple layers, and wherein cooling the at least one treated side comprises contacting the at least one treated side of at least one layer of said web or film with the cooling element.

8. The method as claimed in claim 1, wherein the wavelength of the UV irradiation is in the range of 200 nm to 380 nm.

9. The method as claimed in claim 1, wherein said suspension has a content of nanocellulose in a range of 0.1 to 50% by weight based on the total dry content of the suspension.

10. The method as claimed in claim 1, wherein the web or film comprises multiple layers, and wherein at least one layer of the film or web is provided with a polymer coating layer subsequent to treating the at least one side and prior to cooling the at least one treated side.

11. The method as claimed in claim 1, wherein a solid content of the treated web or film is at least 65 weight-%, based on the total dry content of the web or film.

12. The method as claimed in claim 1, wherein the treated web or film comprises at least 70 wt-% nanocellulose, based on the total dry content of the film.

13. The method as claimed in claim 1, wherein the treated web or film OTR value is in the range of 10 to 250 cc/m²/24 h at 38° C. and 85% relative humidity (RH).

14. The method as claimed in claim 1, wherein the web or film is further provided with or contacted with at least one photo-active material.

15. The method as claimed in claim 1, wherein at least one pressing step is provided in connection with or after the UV or EB treatment step.

16. The method as claimed in claim 1 wherein the substantially dry web or film has an Oxygen Transmission Rate (OTR) value in the range of 0.1 to 153 cc/m²/24 h at 38° C. and 85% relative humidity (RH).

17. The method as claimed in claim 1, wherein a solid content of the treated web or film is at least 75 weight-%, based on the total dry content of the film.

18. The method as claimed in claim 1, wherein a solid content of the treated web or film is at least 85 weight-%, based on the total dry content of the film.

19. The method as claimed in claim 1, wherein the treated web or film comprises at least 70 wt-% nanocellulose, based on the total dry content of the film.

20. The method as claimed in claim 1, wherein the OTR value is in the range of 40 to 250 cc/m²/24 h at 38° C. and 85% relative humidity (RH).

21. The method as claimed in claim 1, wherein the OTR value is in the range of 110 to 250 cc/m²/24 h at 38° C. and 85% relative humidity (RH).

22. The method as claimed in claim 1, wherein the OTR value is in the range of 0.1 to 198 cc/m²/24 h at 38° C. and 85% relative humidity (RH).

\* \* \* \* \*